United States Patent

[11] 3,596,039

| | | |
|---|---|---|
| [72] | Inventor | Michael Edmond<br>Muenchen, Germany |
| [21] | Appl. No. | 841,463 |
| [22] | Filed | July 14, 1969 |
| [45] | Patented | July 27, 1971 |
| [73] | Assignee | Sprague Electric Company<br>North Adams, Mass. |
| [32] | Priority | July 19, 1968 |
| [33] | | Germany |
| [31] | | P 17 64 699.0 |

[54] TRIMMING THIN-FILM CAPACITORS BY SPARK EROSION
7 Claims, 1 Drawing Fig.

[52] U.S. Cl. .................................................. 219/69
[51] Int. Cl. .................................................. B23p 1/08
[50] Field of Search .......................................... 219/69, 69 E, 69 F, 69 C, 69 P, 69 M, 69 V, 69 G

[56] References Cited
UNITED STATES PATENTS

| | | | |
|---|---|---|---|
| 2,710,325 | 6/1955 | Johnson ..................... | 219/69 M |
| 2,762,946 | 9/1956 | Manchester ................ | 219/69 G |
| 3,324,276 | 6/1967 | Osenbruggen et al. ....... | 219/69 V |

*Primary Examiner*—R. F. Staubly
*Attorneys*—Connolly and Hutz, Vincent H. Sweeney, James Paul O'Sullivan and David R. Thornton

ABSTRACT: Both electrodes of a thin film capacitor are shorted to ground. A high-voltage pulse is applied to a needle electrode that is separated from the electrodes a sufficient distance to permit formation of a spark which burns away a portion of both electrodes.

PATENTED JUL 27 1971 3,596,039
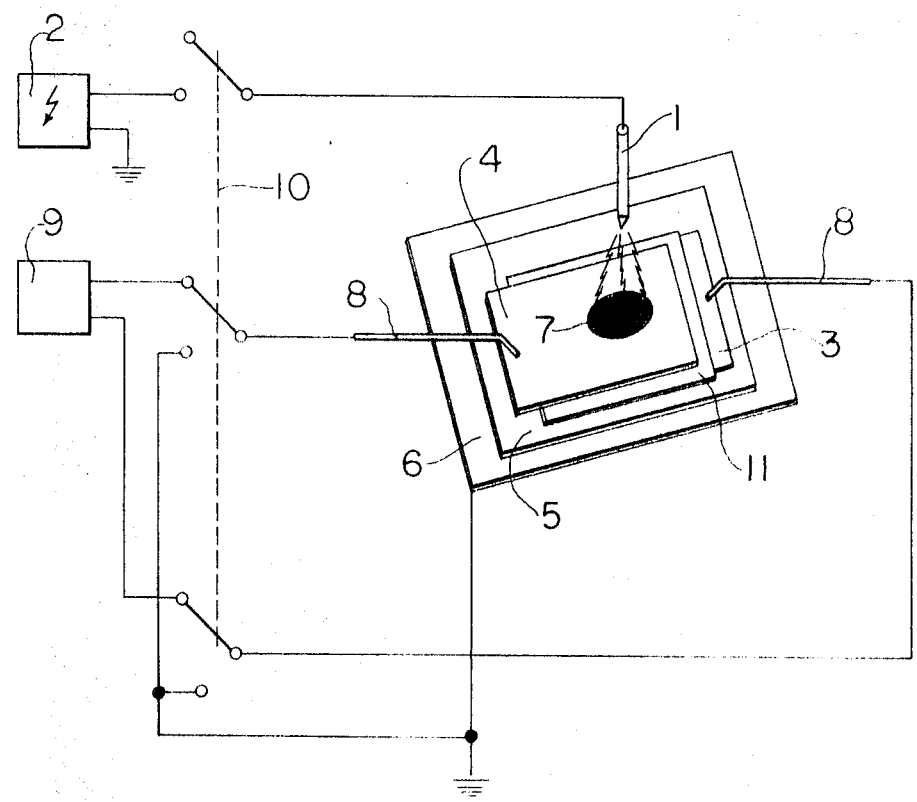

TRIMMING THIN-FILM CAPACITORS BY SPARK EROSION

BACKGROUND OF THE INVENTION

This invention relates to thin film capacitors, and more particularly to adjustment of the capacitance of a thin film capacitor and to apparatus therefor.

It is well know that thin metal films used in integrated circuits can be selectively burnt away by means of an electrical current. To achieve this according to the prior art, one pole of a voltage source is connected to the film which is to be trimmed, the other pole of the source being connected to a fine needle. The needle is then place on the surface of the film. The small portion of the film in contact with the needle is then heated to such an extent by the current flowing through the contact resistance that this small portion of the film is either evaporated or oxidized. In order to make the contact resistance as large as possible, it is necessary to use a needle with an extremely fine point. The area which is burnt away is then very small. The metal film can then be delineated to raise its resistance to a large value by moving the needle across the film in a zigzag pattern.

In the production of metallized paper capacitors it is known to selectively remove a portion of the metal film by spark erosion through an in-contact template made of an insulator. In The case of thin-film capacitors it is not possible to use such a template as the extremely thin-films would become damaged.

A technique for adjusting the values of thin-film capacitors is known, whereby a portion of the upper electrode is removed by means of an electron beam. This technique is complicated and expensive, inasmuch as an electron gun with a focusing and deflection system is required and the whole process must be performed under vacuum.

SUMMARY OF THE INVENTION

The invention is concerned with a simple technique with which thin-film capacitors can be swiftly and economically trimmed to very close tolerances. In addition the technique avoids the above mentioned disadvantages.

The invention is concerned with a technique for adjusting the values of thin-film capacitors, whereby a portion of the capacitor electrode is burnt away with the help of an electrical spark; together with a device for carrying out the technique.

In principle the technique consists of placing a needle electrode above a thin-film capacitor, of which both electrodes are short-circuited and earthed, and applying a high-voltage pulse to the needle electrode, whereby a small portion of both electrodes of the thin-film capacitor is burnt away by the spark emanating from the needle electrode; the needle electrode not being in contact with the capacitor.

This technique has the advantage that the position of the needle electrode above the capacitor is not critical; neither is the separation between the needle electrode and the capacitor electrodes. This separation should merely be small enough to enable sparks to be formed; the needle electrode should not, however, come in contact with the capacitor electrodes. A separation of between 0.2 mm. and 1 mm. is suitable. If the separation is too large the discharge cannot be well controlled and the sparks jump from one area to another.

The voltage can be varied such that the trim rate, that is, the reduction of capacitance per unit time, can be easily altered. For instance, for capacitors with a dielectric film of SiO or $Si_2O_3$ 1 $\mu$ thick, the trim rate lies between 25 pF./sec. and 2.0 pF./sec. for voltages between 60 kv. and 40 kv. It is possible under these conditions to trim capacitors to an accuracy of ±0.5 pF. or better. The current required at these voltages is in the microampere range.

It is not necessary to move the needle electrode to and fro above the capacitor; with a fixed electrode the area of the capacitor which is burnt away increases until the distance between the needle electrode and the capacitor electrodes is so large that a spark discharge can no longer be formed.

It is preferable to place the thin-film circuit on an earthed metal plate. This causes the electric field between the needle electrode and the capacitor electrodes to become homogeneous, which reduces the chances of uncontrolled discharges.

A particularly useful and economic method of producing the high voltage required for this technique is with a Tesla-transformer. As the voltage so produced is an alternating voltage of high frequency, it is necessary to use shorting and earthing connections which have both low resistance and low inductance.

The trimming process is continuously controlled, whereby the high voltage is momentarily switched on so that a spark is caused between the needle electrode and the capacitor electrodes, thus removing a small portion of the capacitor (parts of both electrodes and the dielectric film are removed). A bridge is then switched into the circuit to measure the capacitance. If the capacitance is still too high, the capacitor is once again trimmed as described. This whole process is repeated until the desired capacitance is achieved.

BRIEF DESCRIPTION OF THE DRAWING

The sole figure is a diagrammatic showing of the adjustment of a thin film capacitor in accordance with this invention.

DESCRIPTION OF THE PREFERRED EMBODIMENT

The setup shown in the figure has proven to be particularly suitable. It consists of an earthed Tesla-transformer, a measuring bridge, a needle electrode, two contact electrodes and a switch. The thin-film capacitor is alternatively connected to the Telsa-transformer and to the measuring bridge. The figure shown the entire apparatus which is required for the technique together with the arrangement of the contact electrodes.

A needle electrode 1 is situated a certain distance above the substrate 5 carrying the thin-film capacitor, which consists of the electrode 3, the dielectric film 11, and the second electrode 4. The thin-film capacitor sits on an earthed metal plate 6. The contacts 8 form an electrical connection between the capacitor electrodes 3, 4 and the switch 10; by means of the switch 10 the capacitor is alternately connected to a capacitance bridge 9 and to a high-voltage Tesla-transformer 2. The high-voltage transformer 2 is completely shielded and earthed to avoid interference with the measuring equipment 9.

The figure shows the arrangement for measuring the capacitance. During the trimming process, the sparking between the needle electrode 1 and the thin-film capacitor burns away the area 7 in the electrodes 3 and 4.

The invented technique can be easily automated and capacitors can be simply and economically trimmed. LC resonance circuits can thus be adjusted to give a particular resonant frequency. Also RC networks can be trimmed, although it is normal to do this by adjusting the value of the resistor. If, however, the resistance value has been overtrimmed this can be corrected by using the above technique to adjust the capacitor values, consequently the yield is increased.

What I claim is:

1. A technique for fine trimming of thin-film capacitors having a thin dielectric layer between thin film electrodes, whereby small portions of said capacitor electrodes are removed by means of an electrical spark, both of said capacitor electrodes being short-circuited and earthed, high voltage from an earthed Tesla-transformer being on a needle electrode which is spaced from the capacitor without touching either of said capacitor electrodes a distance such that a spark is produced between said capacitor and said needle electrode, by which means portions of both said electrodes are removed.

2. A technique as in claim 1 in which said capacitor has a substrate which is place on an earthed metal plate.

3. A technique as in claim 1 in which the spark gap between said capacitor and said needle electrode is set between 0.2 mm. and 1 mm.

4. A technique as in claim 1 in which the level of the high voltage is varied.

5. A technique as in claim 4 in which the high voltage lies between 40 kv. and 60 kv.

6. A technique as in claim 1 in which the capacitor is alternately trimmed and measured.

7. A technique as in claim 6 in which said earthed Tesla-transformer, a measuring bridge, said needle electrode, two contacts, and a switch are so arranged that the capacitor can be alternately connected to a measuring bridge or the high voltage.